United States Patent
Hsieh et al.

(10) Patent No.: US 8,357,022 B2
(45) Date of Patent: Jan. 22, 2013

(54) MANUFACTURING APPARATUS FOR LIQUID CRYSTAL PANEL

(75) Inventors: Ming-Jen Hsieh, Miao-Li County (TW); Po-Fu Chen, Miao-Li County (TW); Hsu-Kuan Hsu, Miao-Li County (TW); Yu-Wen Chih, Miao-Li County (TW); Chun-Hung Chiang, Miao-Li County (TW)

(73) Assignees: Innocom Technology (Schenzhen) Co., Ltd., Schenzhen (CN); Chimei Innolux Corporation, Miao-Li County (TW)

( * ) Notice: Subject to any disclaimer, the term of this patent is extended or adjusted under 35 U.S.C. 154(b) by 0 days.

(21) Appl. No.: 13/357,358

(22) Filed: Jan. 24, 2012

(65) Prior Publication Data

US 2012/0190267 A1    Jul. 26, 2012

(30) Foreign Application Priority Data

Jan. 25, 2011  (TW) .............................. 100102606 A

(51) Int. Cl.
  *H01J 9/46* (2006.01)
  *G02F 1/133* (2006.01)
  *B05D 3/06* (2006.01)
(52) U.S. Cl. ............................. 445/66; 349/116; 427/58
(58) Field of Classification Search .................... 445/66; 349/16; 427/58
  See application file for complete search history.

(56) References Cited

U.S. PATENT DOCUMENTS 6,893,688 B2 *  5/2005  Nakahara ...................... 427/553
2002/0061361 A1 *  5/2002  Nakahara ...................... 427/58

FOREIGN PATENT DOCUMENTS

JP    2002196337 A  *  7/2002

* cited by examiner

*Primary Examiner* — Joseph L Williams
(74) *Attorney, Agent, or Firm* — Lowe, Hauptman, Ham & Berner, LLP

(57) ABSTRACT

A manufacturing apparatus for liquid crystal (LC) panels, including a temperature control device, an LC status monitor, a backlight source and an ultraviolet set. The temperature control device, on which an LC panel is placed, provides temperature control and is perforated to pass light therethrough. The LC status monitor is operative to observe the LC panel while the light is emitted from the backlight source and transmitted through the LC panel and the temperature control device as back-lights of the LC panel. The ultraviolet set is operative to expose the LC panel to ultraviolet light. The relative position between the temperature control device and the backlight source is adjustable, to switch the operating state of the apparatus. In the first operating state, the LC panel can be observed by the LC status monitor. In the second operating state, the LC panel can be exposed to ultraviolet light.

10 Claims, 8 Drawing Sheets

MANUFACTURING APPARATUS FOR LIQUID CRYSTAL PANEL

This Application claims priority of Taiwan Patent Application No. 100102606, filed on Jan. 25, 2011, the entirety of which is incorporated by reference herein.

BACKGROUND OF THE INVENTION

1. Field of the Invention

The present invention relates to a liquid crystal panel (LC panel) manufacturing apparatus.

2. Description of the Related Art

For LC panel manufacturing, it is important to properly select the liquid crystal material to be used in the making of an LC panel.

For different liquid crystal materials, different fabrication processes are required. Therefore, developing an LC panel manufacturing apparatus for varied fabrication processes is one important issue in the LC panel manufacturing field.

BRIEF SUMMARY OF THE INVENTION

An apparatus for manufacturing LC panels is disclosed, which comprises a temperature control device, an LC status monitor, a backlight source and an ultraviolet set.

When operating the LC panel manufacturing apparatus, an LC panel is placed on the temperature control device to be temperature controlled during the manufacturing process. The temperature control device contains at least one opening. The backlight source is operative to emit light through the at least one opening and the LC panel as backlight of the LC panel. The LC status monitor is operative to observe the LC panel. The ultraviolet set is operative to emit ultraviolet on the LC panel.

For the LC panel manufacturing apparatus, the relative position between the temperature control device and the backlight source is adjustable. By adjusting the relative position between the temperature control device and the backlight source, the LC panel manufacturing apparatus is switched between a first operating state and a second operating state. In the first operating state, the LC panel can be observed by the LC status monitor. In the second operating state, the LC panel can be exposed to ultraviolet light.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description shows several embodiments carrying out the invention. This description is made for the purpose of illustrating the general principles of the invention and should not be taken in a limiting sense. The scope of the invention is best determined by reference to the appended claims.

An LC panel manufacturing apparatus in accordance with an exemplary embodiment of the invention comprises a temperature control device, an LC status monitor, a backlight source and an ultraviolet set.

When operating the LC panel manufacturing apparatus, an LC panel is placed on the temperature control device to be temperature controlled during the manufacturing process. The temperature control device contains at least one opening. The backlight source is operative to emit light through the at least one opening and the LC panel as backlight of the LC panel. The LC status monitor is operative to observe the LC panel. The ultraviolet set is operative to emit ultraviolet on the LC panel.

In the LC panel manufacturing apparatus, the relative position between the temperature control device and the backlight source is adjustable. By adjusting the relative position between the temperature control device and the backlight source, the LC panel manufacturing apparatus is switched between a first operating state and a second operating state. In the first operating state, the LC panel can be observed by the LC status monitor. In the second operating state, the LC panel can be exposed to ultraviolet light.

The LC panel manufacturing apparatus may be implemented in different ways.

Figure 1A:
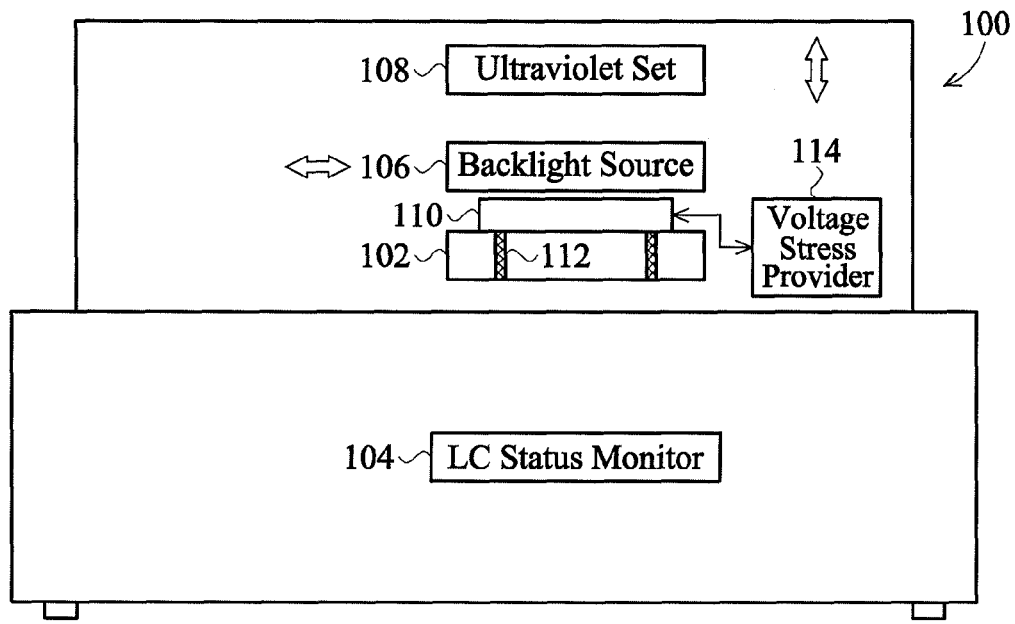
FIGS. 1A, 1B, 2A and 2B depict an LCD panel manufacturing apparatus in accordance with an exemplary embodiment of the invention.
Figure 1B:
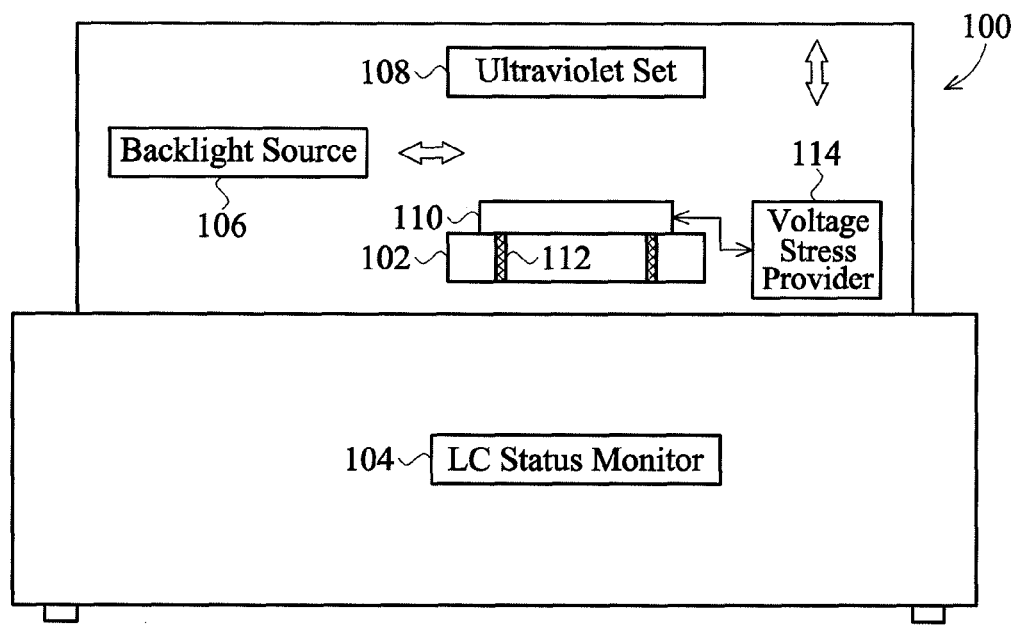

FIGS. 1A, 1B, 2A and 2B illustrate one LC panel manufacturing apparatus in accordance with one exemplary embodiment of the invention. The LC panel manufacturing apparatus 100 comprises a temperature control device 102, an LC status monitor 104, a backlight source 106 and an ultraviolet set 108. The backlight source 106 is movable. Comparing FIGS. 1A and 1B, the difference is the position of the backlight source 106. In FIG. 1A, the LC panel manufacturing apparatus 100 is in the first operating state. In FIG. 1B, the LC panel manufacturing apparatus 100 is in the second operating state.

In the LC panel manufacturing apparatus 100, the temperature control device 102 is configured for placement of an LC panel 110 and thereby to control the temperature of the LC panel 110 during the manufacturing process. In the embodiment shown in the figures, the LC panel 110 is placed on the temperature control device 102. In this embodiment, the space above the temperature control device 102 is regarded as a first side of the temperature control device 102. As shown, the ultraviolet set 108 is placed at the first side of the temperature control device 102 as well. As for the LC status monitor 104, it is placed below the temperature control device 102. In this embodiment, the space below the temperature control device 102 is regarded as a second side, opposite to the first side, of the temperature control device 102. It has to be noted that in other embodiments the first side of the temperature control device 102 is not limited to the space above the temperature control device 102 and the second side of the temperature control device 102 is not limited to the space below the temperature control device 102. For example, in some embodiments, the space below the temperature control device 102 is regarded as the first side of the temperature control device 102 while the space above the temperature control device 102 is regarded as the second side of the temperature control device 102.

Referring to the first operating state depicted in FIG. 1A, the backlight source 106 is placed between the ultraviolet set 108 and the LC panel 110. In this manner, the backlight source 106 not only generates backlight for the LC status monitor 104 to observe the LC panel 110 but also shelters the LC panel 110 from the ultraviolet set 108 at the same time. Through the openings 112 of the temperature control device 102, the LC status of the LC panel 110 is captured by the LC status monitor 104 for observation of the LC panel 110.

Referring to the second operating state depicted in FIG. 1B, the backlight source 106 is removed from between the ultraviolet set 108 and the LC panel 110. In this manner, the LC panel 110 is exposed to the ultraviolet light from the ultraviolet set 108, and, the monomer mixed in the LC panel 110 is converted to high polymer by the ultraviolet light.

Referring to FIGS. 1A and 1B, the ultraviolet set 108 is movable. By moving the ultraviolet set 108, the distance between the ultraviolet set 108 and the LC panel 110 is adjusted and the energy that the ultraviolet set 108 gives to the LC panel 110 is adjusted accordingly.

Furthermore, the LC panel manufacturing apparatus 100 may further comprise a voltage stress provider 114 as shown in FIGS. 1A and 1B. The voltage stress provider 114 is operative to exert a voltage stress on the LC materials of the LC panel 110. In other embodiments, the voltage stress provider is not equipped on the inside of the LC manufacturing apparatus but is externally coupled to the LC panel manufacturing apparatus.

Furthermore, the LC status monitor 104 may be implemented by a CCD image sensor or any photo detector. The temperature control device 102 may be a heat plate. The backlight source 106 may be a backlight plate.

Figure 2A:
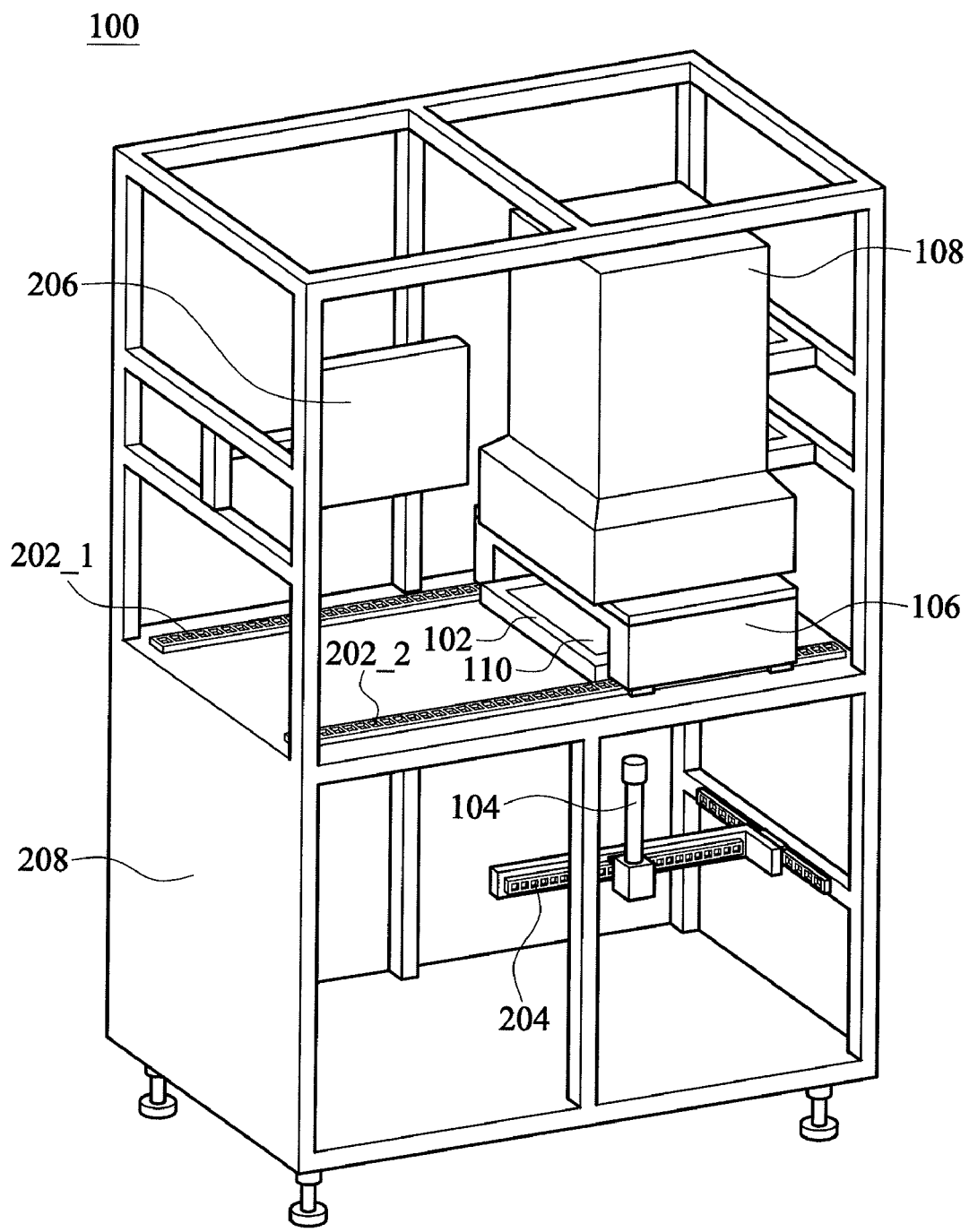
Figure 2B:
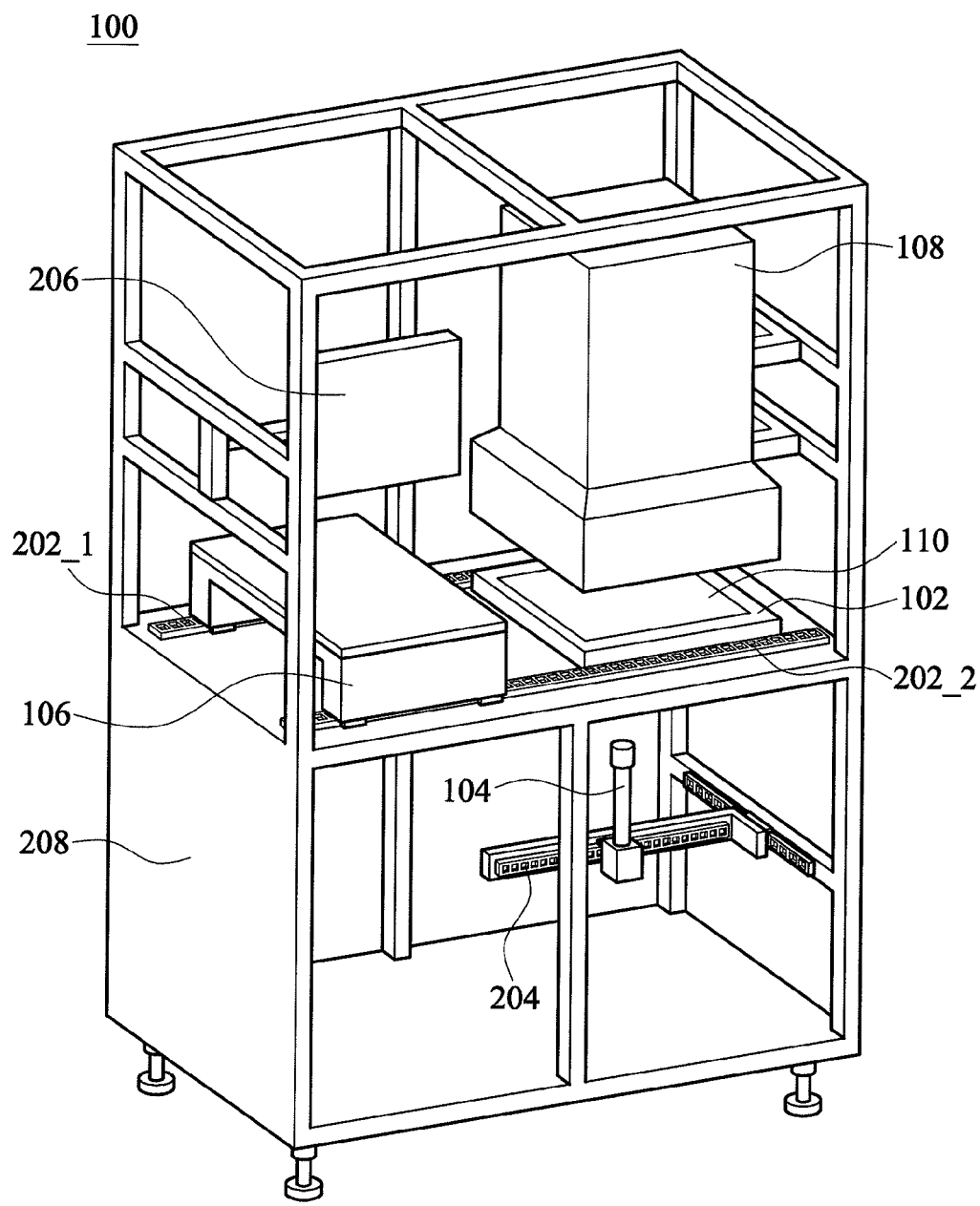

FIG. 2A and FIG. 2B depict the 3D-version of the LC panel manufacturing apparatus 100, corresponding to the first operating state shown in FIG. 1A and the second operating state shown in FIG. 1B, respectively. As shown in FIGS. 2A and 2B, the LC panel manufacturing apparatus 100 may further comprise a slide structure (including a first slide rail 202_1 and a second slide rail 202_2). The backlight source 106 is moved along the first and second slide rails 202_1 and 202_2 and thereby the LC panel manufacturing apparatus 100 is switched to the first operating state as shown in FIG. 2A or the second operating state as shown in FIG. 2B.

The 3D-version shown in FIGS. 2A and 2B further shows that the LC panel manufacturing apparatus 100 may further comprise an LC status monitor moving mechanism 204, a display 206 showing the captured pictures, and a machine frame 208. The LC status monitor moving mechanism 204 may allow the LC status monitor 104 to move in a plane—for example, a horizontal movement. The pictures captured by the LC status monitor 104 may be shown on the display 206, and thereby a person skilled in the art can observe the status of the LC materials of the LC panel 110. The disclosed components of the manufacturing apparatus may be mounted together by the machine frame 208. In this manner, the verification test system (e.g., including the backlight source 106, the LC status monitor 104, the LC status monitor moving mechanism 204 and the display 206), the temperature control device 102 and the ultraviolet exposure system (including the ultraviolet set 108) are integrated in one machine.

Figure 3A:
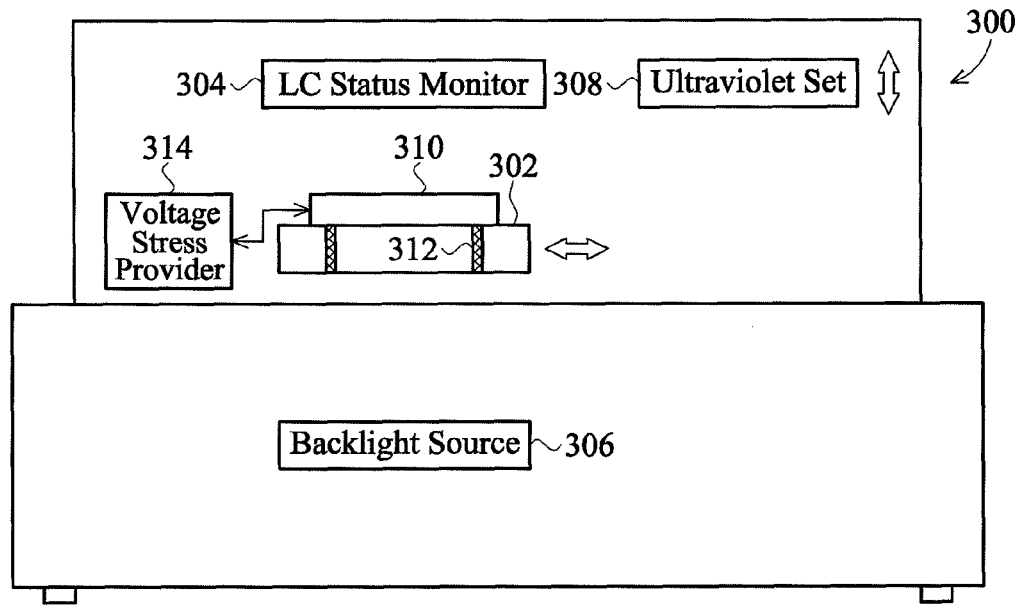
FIGS. 3A, 3B, 4A and 4B depict an LCD panel manufacturing apparatus in accordance with another exemplary embodiment of the invention.
Figure 3B:
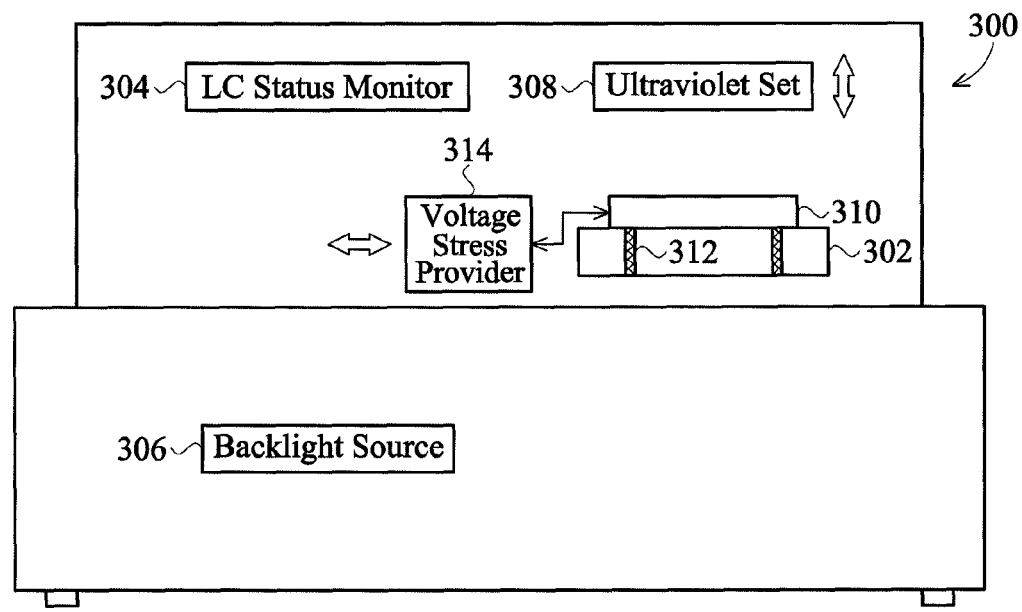

FIGS. 3A, 3B, 4A and 4B illustrate one LC panel manufacturing apparatus in accordance with another exemplary embodiment of the invention. The LC panel manufacturing apparatus 300 comprises a temperature control device 302, an LC status monitor 304, a backlight source 306 and an ultraviolet set 308. The temperature control device 302 is movable. When operating the LC panel manufacturing apparatus, an LC panel 310 is settled on the temperature control device 302 to be temperatures controlled by temperature control device 302 at any time. Comparing FIGS. 3A and 3B, the difference is the position of the temperature control device 302. In FIG. 3A, the LC panel manufacturing apparatus 300 is in the first operating state, wherein the temperature control device 302 is placed at a first position. In FIG. 3B, the LC panel manufacturing apparatus 300 is in the second operating state, wherein the temperature control device 302 is placed at a second position. In the embodiment shown by FIGS. 3A and 3B, the LC status monitor 304 is placed in a space above the first position (defined as a first side of the first position) and the backlight source 306 is placed in a space below the first position (defined as a second side, opposite to the first side, of the first position). The ultraviolet set 308 is placed in a space above the second position (i.e., the first side of the second position). Note that in other embodiments the LC status monitor may be placed in a space below the first position rather than above the first position (in this case, the space below the first position is defined as the first side of the first position), the backlight source may be placed in a space above the first position (in this case, the space above the first position is defined as the second side of the first position), and the ultraviolet set may be placed in a space below the second position (i.e., the first side of the second position). Note that the aforementioned description about the positions of the disclosed components is not intended to limit the scope of the invention. By arranging the disclosed components, the LC panel carried by the temperature control device can be monitored by the LC status monitor without being exposed to ultraviolet light when the temperature control device is placed at the first position, and, when the temperature control device is placed at the second position, the LC panel carried by the temperature control device can be exposed to ultraviolet light.

Referring to the first operating state depicted in FIG. 3A, the temperature control device 302 is moved to the first position, between the LC status monitor 304 and the backlight source 306. The temperature control device 302 has at least one opening 312. The light emitted from the backlight source 306 can pass through the opening 312 to backlight the LC plane 310, and thereby the LC status monitor 304 can capture the LC status of the LC panel 310 for observation and research.

Referring to the second operating state illustrated in FIG. 3B, the temperature control device 302 is moved to the second position and so that the LC panel 310 can be exposed to the ultraviolet light from the ultraviolet set 308 and the monomer mixed in the LC panel 310 may be converted to polymer materials.

Referring to FIGS. 3A and 3B, the ultraviolet set 308 is movable. By moving the ultraviolet set 308, the distance between the ultraviolet set 308 and the LC panel 310 is adjusted and the energy that the ultraviolet set 308 gives to the LC panel 310 is adjusted accordingly.

Furthermore, the LC panel manufacturing apparatus 300 may further comprise a voltage stress provider 314 as shown in FIGS. 3A and 3B. The voltage stress provider 314 is operative to exert a voltage stress on the LC materials of the LC panel 310. Referring to the embodiment shown by FIGS. 3A and 3B, the voltage stress provider 314 may be moved with the moving of the temperature control device 302. In other embodiments, the voltage stress provider is not equipped inside the LC manufacturing apparatus but is externally coupled to the LC panel manufacturing apparatus.

Furthermore, the LC status monitor 304 may be implemented by a CCD image sensor or any photo detector. The temperature control device 302 may be a heat plate. The backlight source 306 may be a backlight plate.

Figure 4A:
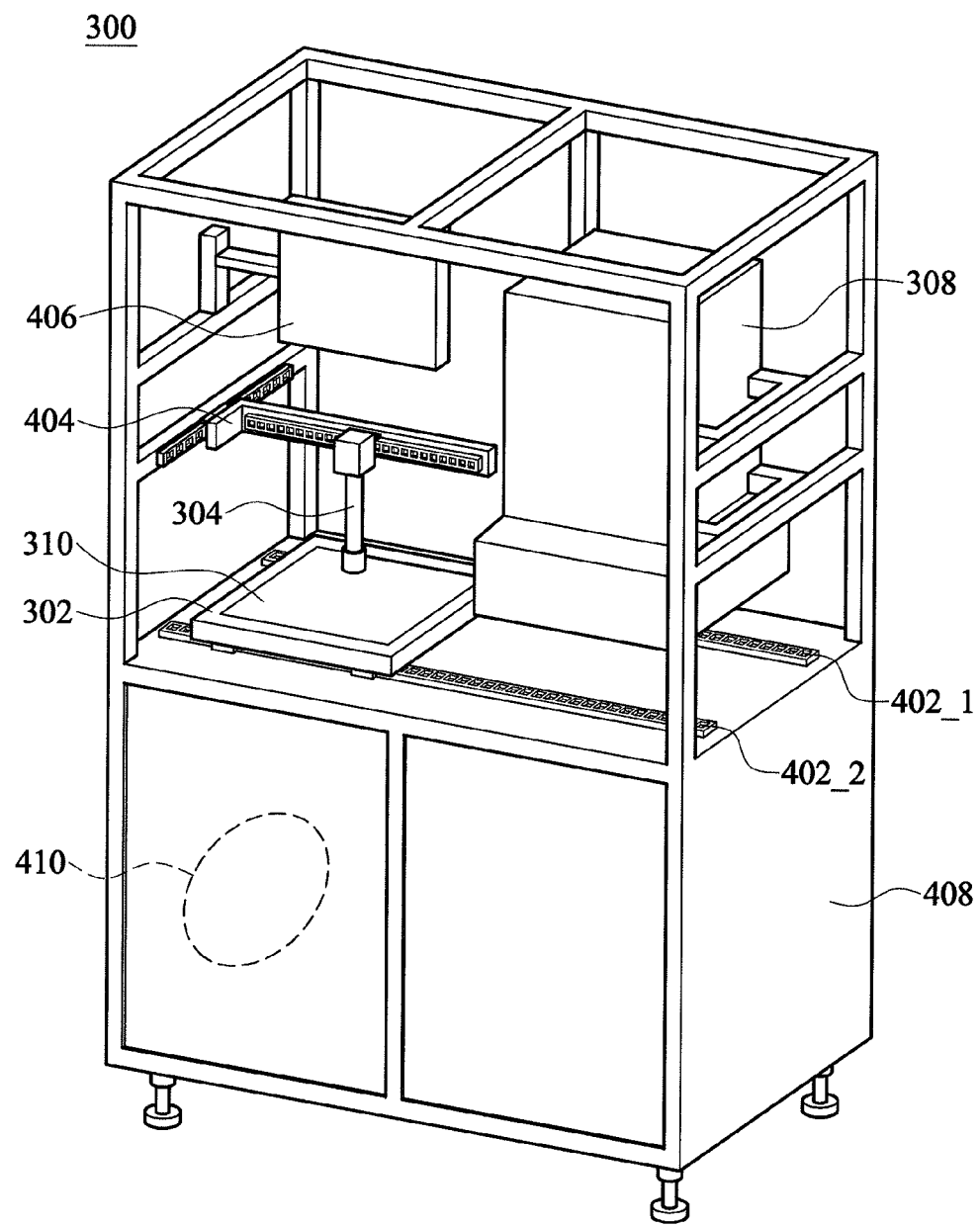
Figure 4B:
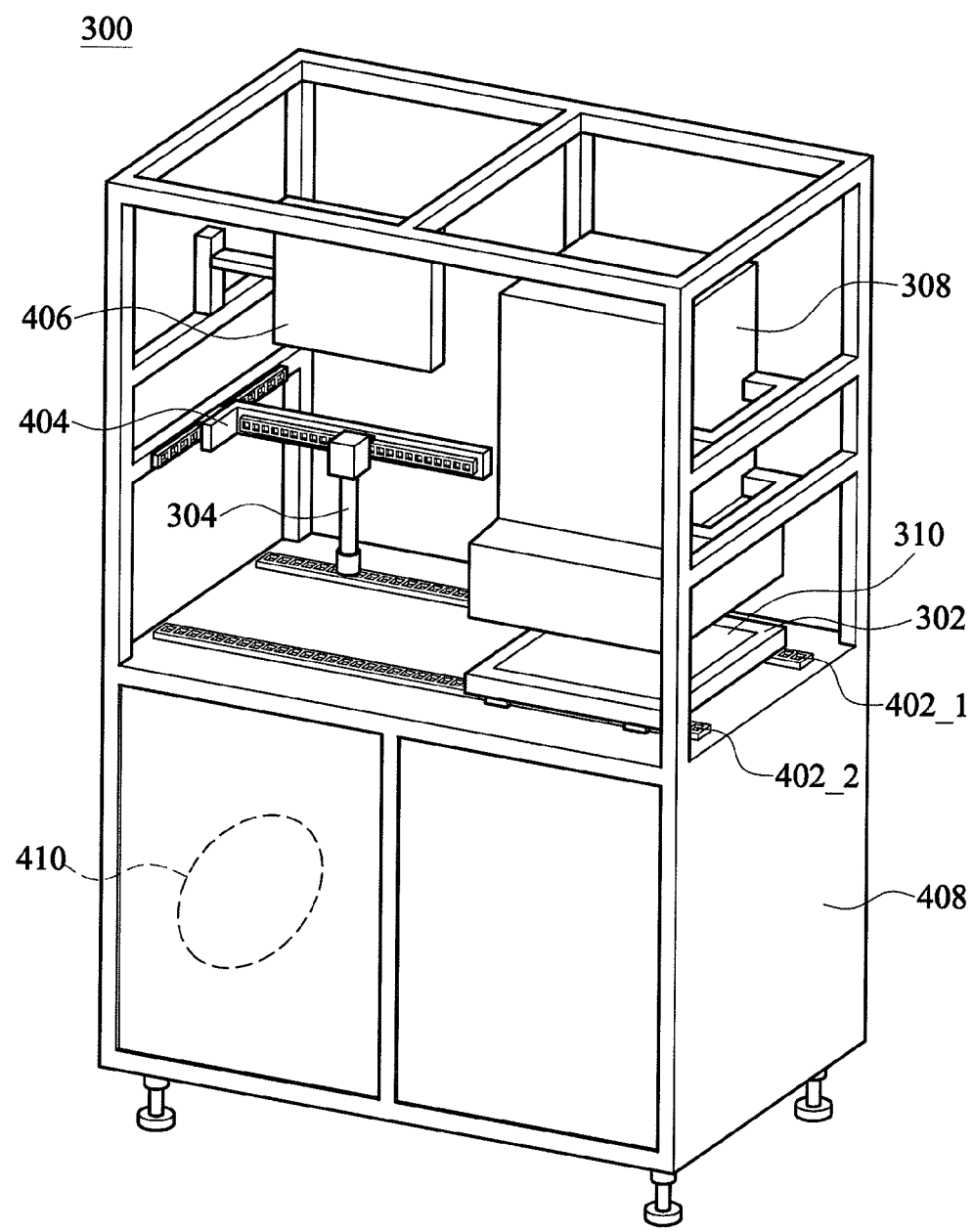

FIG. 4A and FIG. 4B depict the 3D-version of the LC panel manufacturing apparatus 300, corresponding to the first operating state shown in FIG. 3A and the second operating state shown in FIG. 3B, respectively. As shown in FIGS. 3A and 3B, the LC panel manufacturing apparatus 300 may further comprise a slide structure (including a first slide rail 402_1 and a second slide rail 402_2). Along the slide structure formed by the first and second slide rails 402_1 and 402_2, the temperature control device 302 is moved between the first position and the second position, and thereby the LC panel manufacturing apparatus 300 is switched to the first operating state as shown in FIG. 4A or the second operating state as shown in FIG. 4B.

The 3D-version shown in FIGS. 4A and 4B further shows that the LC panel manufacturing apparatus 300 may further comprise an LC status monitor moving mechanism 404, a display 406 showing the captured pictures, and a machine frame 408. The LC status monitor moving mechanism 404 may allow the LC status monitor 404 to move in a plane—for example, a horizontal movement. The pictures captured by the LC status monitor 304 may be shown on the display 406, and thereby a person skilled in the art can observe the status of the LC materials of the LC panel 310. The disclosed components of the manufacturing apparatus may be mounted together by the machine frame 408. In this manner, the verification test system (e.g., including the backlight source placed at a position 410, the LC status monitor 304, the LC status monitor moving mechanism 404 and the display 406), the heating system (including the temperature control 302) and the ultraviolet exposure system (including the ultraviolet set 308) are integrated in one machine.

The aforementioned LC panel manufacturing apparatus may be used in LC panel fabrication of different LC materials or fabrication process design for different LC materials.

Figure 5:
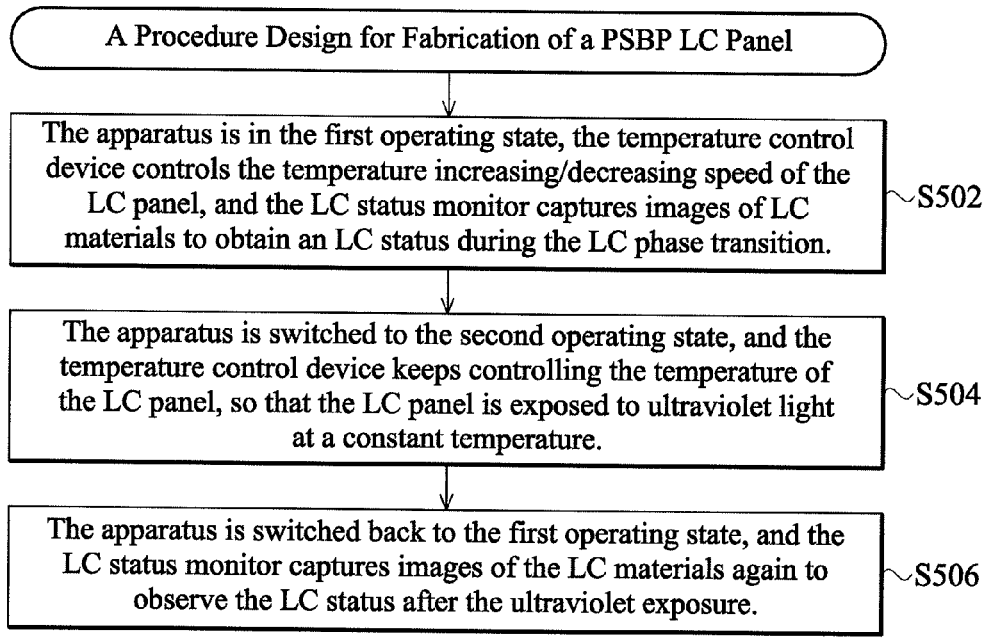
FIG. 5 shows a flowchart, depicting a procedure design for fabrication of a PSBP LC panel.

FIG. 5 shows a flowchart, depicting a procedure design for fabrication of a PSBP (Polymer Stabilized Blue Phase) LC panel. In step S502, the apparatus (100 or 300) is in the first operating state (referring to FIG. 1A, 2A, 3A, or 4A), the temperature control device controls the temperature increasing/decreasing speed of the LC panel, and the LC status monitor captures images of LC materials to obtain an LC status during the LC phase transition. In step S504, the apparatus (100 or 300) is switched to the second operating state (referring to FIG. 1B, 2B, 3B or 4B), and the temperature control device keeps controlling the temperature of the LC panel, so that the LC panel is exposed to ultraviolet light at a constant temperature. In step S506, the apparatus (100 or 300) is switched back to the first operating state (referring to FIG. 1A, 2A, 3A, or 4A), and the LC status monitor captures images of the LC materials again for a person skilled in the art to observe the LC status after the ultraviolet exposure. A person skilled in the art may appreciate that the aforementioned steps may be applied in developing the best panel fabrication process for PSBP LC materials.

In the whole procedure of FIG. 5, the LC panel is placed on the temperature control device all the way. Therefore, a person skilled in the art can handle the temperature of the LC panel in the whole panel fabrication process, and thereby temperature variation problems are removed.

Figure 6:
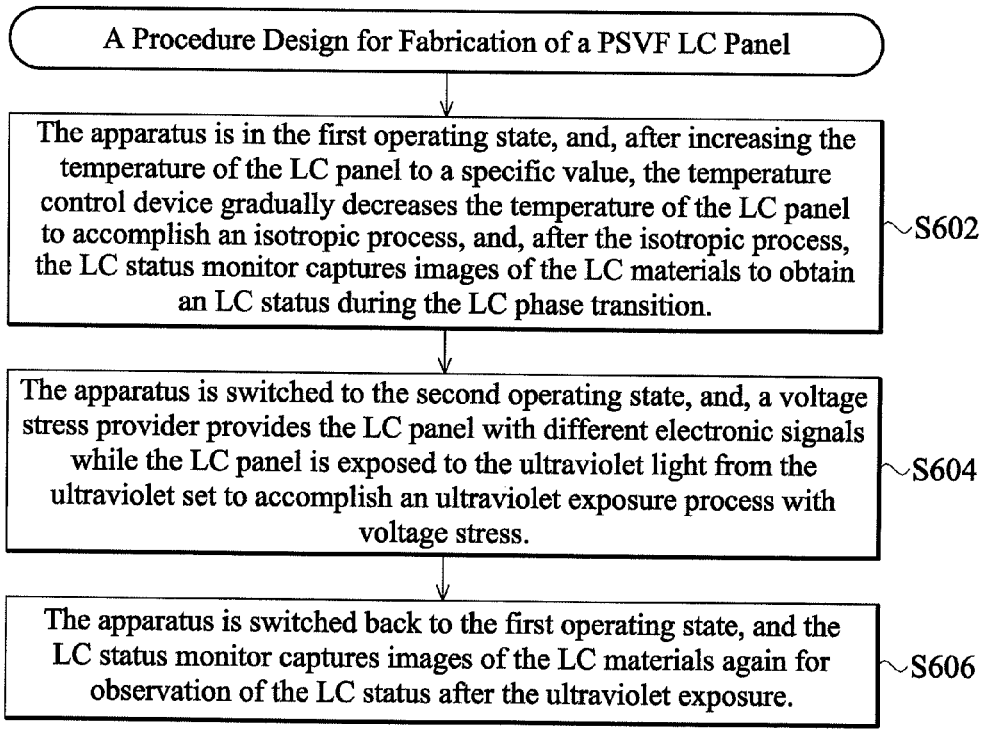
FIG. 6 shows a flowchart, depicting a procedure design for fabrication of a PSVF LC panel.

FIG. 6 shows a flowchart, depicting a procedure design for fabrication of a PSVF (Polymer Stabilized V-shaped Ferroelectric) LC panel. In step S602, the apparatus (100 or 300) is in the first operating state (referring to FIG. 1A, 2A, 3A or 4A). After increasing the temperature of the LC panel to a specific value, the temperature control device gradually decreases the temperature of the LC panel to accomplish an reorientation process. After the isotropic process, the LC status monitor captures images of the LC materials to obtain an LC status during the LC phase transition. In step S604, the apparatus (100 or 300) is switched to the second operating state (referring to FIG. 1B, 2B, 3B or 4B), and a voltage stress provider (may be a built-in device or an external device of the disclosed apparatus) provides the LC panel with various electronic signals. When voltage stresses are exerted on the LC panel, the LC panel is exposed to the ultraviolet light from the ultraviolet set at the same time, so that an ultraviolet exposure process with voltage stress is accomplished. In step S606, the apparatus (100 or 300) is switched back to the first operating state (referring to FIG. 1A, 2A, 3A or 4A), and the LC status monitor captures images of the LC materials again for a person skilled in the art to observe the LC status after the ultraviolet exposure. A person skilled in the art may appreciate that the aforementioned steps may be applied in developing the best panel fabrication process for PSVF LC materials.

Figure 7:
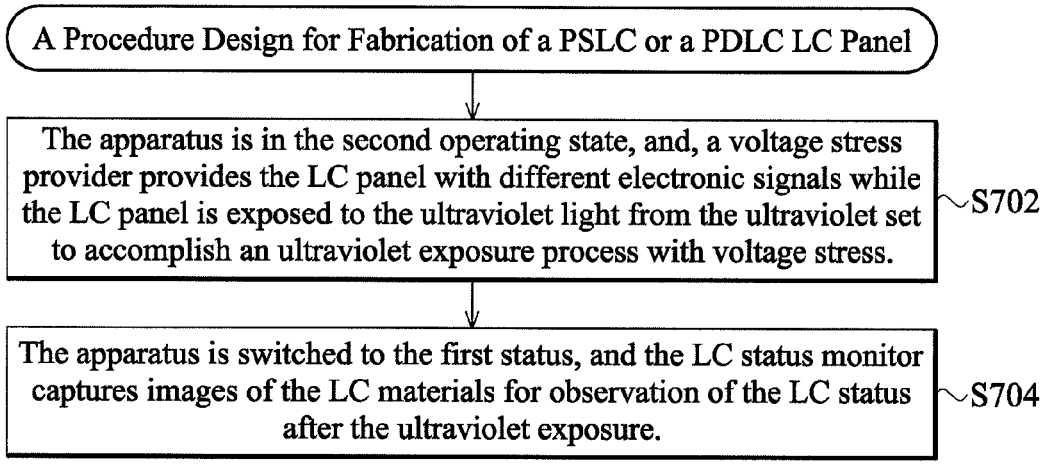
FIG. 7 shows a flowchart, depicting a procedure design for fabrication of a PSLC or PDLC LC panel.

FIG. 7 shows a flowchart, depicting a procedure design for fabrication of a PSLC (Polymer Stabilized Liquid Crystal) or PDLC (Polymer Dispersed Liquid Crystal) LC panel. In step S702, the apparatus (100 or 300) is in the second operating state (referring to FIG. 1B, 2B, 3B or 4B), and a voltage stress provider (may be a built-in device or an external device of the disclosed apparatus) exerts voltage stresses on the LC panel. When voltage stresses are exerted on the LC panel, the LC panel is exposed to the ultraviolet light from the ultraviolet set at the same time, so that an ultraviolet exposure process with voltage stress is accomplished. In step S704, the apparatus (100 or 300) is switched to the first status (referring to FIG. 1A, 2A, 3A, or 4A), and the LC status monitor captures images of the LC materials for a person skilled in the art to observe the LC status after the ultraviolet exposure. A person skilled in the art may appreciate that the aforementioned steps may be applied in developing the best panel fabrication process for PSLC or PDLC LC materials.

Figure 8:
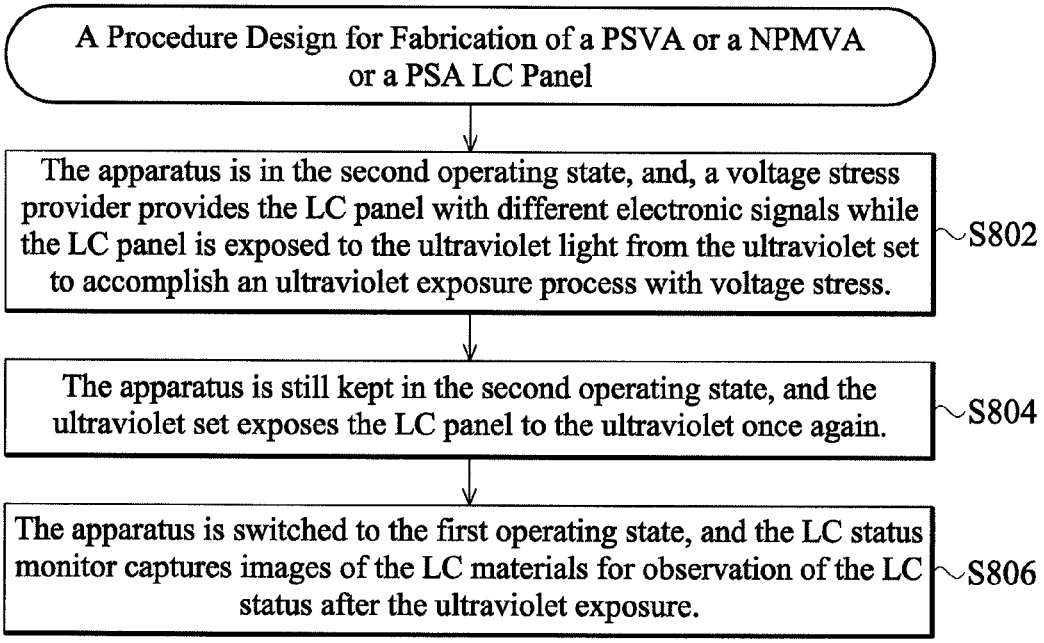
FIG. 8 shows a flowchart, depicting a procedure design for fabrication of a PSVA or NPMVA or PSA LC panel.

FIG. 8 shows a flowchart, depicting a procedure design for fabrication of a PSVA (Polymer Stabilized MVA) or NPMVA (Naro-sized Protrusion MVA) or PSA (Polymer Sustained Alignment) LC panel. In step S802, the disclosed apparatus (100 or 300) is in the second operating state (referring to FIG. 1B, 2B, 3B or 4B), and a voltage stress provider (may be a built-in device or an external device of the disclosed apparatus) exerts voltage stresses on the LC panel. When voltage stresses are exerted on the LC panel, the LC panel is exposed to the ultraviolet light from the ultraviolet set at the same time, so that an ultraviolet exposure process with voltage stress is accomplished. In step S804, the disclosed apparatus (100 or 300) is still kept in the second operating state (referring to FIG. 1B, 2B, 3B or 4B), and the ultraviolet set exposes the LC panel to the ultraviolet once again. In step S806, the disclosed apparatus is switched to the first operating state (referring to FIG. 1A, 2A, 3A or 4A), and the LC status monitor captures images of the LC materials for a person skilled in the art to observe the LC status after the ultraviolet exposure. A person skilled in the art may appreciate that the aforementioned steps may be applied in developing the best panel fabrication process for PSVA or NPMVA or PSA LC materials.

Note that the panel fabrication process design discussed in FIGS. 7 and 8 may merely use the temperature control device to move the LC panel. In these embodiments, the temperature control function of the temperature control device is not required.

In addition to the panel fabrication process design for the aforementioned specific LC materials, the LC panel manufacturing apparatus disclosed in the invention may be further used to develop the panel fabrication process of other LC materials.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A liquid crystal panel manufacturing apparatus, comprising:
    a temperature control device, on which a liquid crystal panel is placed and thereby to control temperature of the liquid crystal panel, wherein the temperature control device contains at least one opening;
    a liquid crystal status monitor, for observation of the liquid crystal panel;
    a backlight source, operative to emit light through the at least one opening and the liquid crystal panel as backlight of the liquid crystal panel; and
    an ultraviolet set, operative to expose the liquid crystal panel to ultraviolet light,
    wherein:
        the liquid crystal panel manufacturing apparatus is switched between a first operating state and a second operating by changing a relative position between the temperature control device and the backlight source;
        the liquid crystal status monitor observes the liquid crystal panel when the liquid crystal panel manufacturing apparatus is in the first operating state; and
        the ultraviolet set exposes the liquid crystal panel to ultraviolet light when the liquid crystal panel manufacturing apparatus is in the second operating state.

2. The liquid crystal panel manufacturing apparatus as claimed in claim 1, wherein:
    the ultraviolet set is placed at a first side of the temperature control device, which is the same side as the liquid crystal panel;
    the liquid crystal status monitor is placed at a second side, opposite to the first side, of the temperature control device; and
    the backlight source is movable and is placed between the ultraviolet set and the liquid crystal panel when the liquid crystal panel manufacturing apparatus is in the first operating state, and is removed from between the backlight source and the liquid crystal panel when the liquid crystal panel manufacturing apparatus is in the second operating state.

3. The liquid crystal panel manufacturing apparatus as claimed in claim 2, further comprising a slide structure for moving the backlight source.

4. The liquid crystal panel manufacturing apparatus as claimed in claim 2, wherein the ultraviolet set is movable.

5. The liquid crystal panel manufacturing apparatus as claimed in claim 1, wherein the temperature control device is movable.

6. The liquid crystal panel manufacturing apparatus as claimed in claim 5, further comprising a slide structure for moving the temperature control device.

7. The liquid crystal panel manufacturing apparatus as claimed in claim 5, wherein, when the temperature control device is at a first position, the liquid crystal status monitor is at a first side of the temperature control device and the backlight source is at a second side, opposite to the first side, of the temperature control device.

8. The liquid crystal panel manufacturing apparatus as claimed in claim 7, wherein the ultraviolet set is aligned with a second position and, when the temperature control device is at the second position, the ultraviolet light from the ultraviolet set is accessible to the liquid crystal panel which is placed on the temperature control device.

9. The liquid crystal panel manufacturing apparatus as claimed in claim 8, wherein the ultraviolet set is movable.

10. The liquid crystal panel manufacturing apparatus as claimed in claim 1, further comprising a voltage stress provider, exerting a voltage stress on liquid crystal materials within the liquid crystal panel.

* * * * *